(12) United States Patent
Sainz

(10) Patent No.: US 11,698,108 B2
(45) Date of Patent: Jul. 11, 2023

(54) TRIPOT JOINT WITH ASSEMBLY AND DISASSEMBLY RING

(71) Applicant: Steering Solutions IP Holding Corporation, Saginaw, MI (US)

(72) Inventor: Anthony A. Sainz, Saginaw, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 288 days.

(21) Appl. No.: 16/992,851

(22) Filed: Aug. 13, 2020

(65) Prior Publication Data

US 2022/0049743 A1 Feb. 17, 2022

(51) Int. Cl.
*F16D 3/205* (2006.01)
*F16C 35/073* (2006.01)
*F16D 1/08* (2006.01)

(52) U.S. Cl.
CPC .......... *F16D 3/2055* (2013.01); *F16C 35/073* (2013.01); *F16D 1/0835* (2013.01); *F16C 2361/41* (2013.01); *Y10S 72/714* (2013.01); *Y10S 464/905* (2013.01)

(58) Field of Classification Search
CPC .... F16D 3/2055; F16D 1/0835; F16C 35/073; F16C 2361/41; Y10S 72/714; Y10S 464/905
USPC ......................................................... 464/111
See application file for complete search history.

(56) References Cited

U.S. PATENT DOCUMENTS

| | | | | |
|---|---|---|---|---|
| 4,275,799 A | * | 6/1981 | Guimbretiere | F16D 3/185 464/111 |
| 4,280,340 A | * | 7/1981 | Goguet | F16D 3/845 464/111 |
| 4,798,560 A | * | 1/1989 | Farrell | B60B 27/0005 |
| 5,951,401 A | * | 9/1999 | Kita | F16D 3/2055 464/905 |
| 6,210,282 B1 | * | 4/2001 | Hofmann | F16D 3/2055 464/905 |
| 7,278,894 B2 | * | 10/2007 | Lyon | F16D 3/227 |

FOREIGN PATENT DOCUMENTS

GB 2 134 216 A * 8/1984 ............... 464/905

* cited by examiner

*Primary Examiner* — Greg Binda
(74) *Attorney, Agent, or Firm* — Dickinson Wright PLLC

(57) ABSTRACT

A tripot housing and method of manufacture thereof. The tripot housing includes a housing body extending along an axis between a first end having an end wall and an open second end. A drive shaft extends from the end wall along the axis away from the second end. The housing body has an outer surface and an inner surface. The inner surface defines a guide channel that extends between the first end and the second end. The outer surface has a first region extending axially along a direction from the first end toward the second end to a shoulder that extends radially outwardly from the first region. The outer surface has a second region extending axially from the shoulder toward the second end. A ring has an inner surface disposed in an interference fit on first region and an outer surface extending radially outwardly from the second region.

16 Claims, 5 Drawing Sheets

TRIPOT JOINT WITH ASSEMBLY AND DISASSEMBLY RING

FIELD OF THE INVENTION

The present disclosure generally relates to shaft assemblies for motor vehicles, and more specifically, to constant velocity joints having a drive shaft extending from a housing for operable connection to a drive source, such as a transmission.

BACKGROUND OF THE INVENTION

Constant velocity joints, such as tripot joints, interconnect rotary shaft members of a vehicle to one another. The tripot joint includes a tripot housing having an inner surface providing a plurality of roller tracks for guiding a plurality of roller assemblies and a drive shaft extending from the housing for operable connection to a drive source, such as a transmission.

During assembly of the tripot housing and drive shaft to the drive source, such as the transmission, challenges of gripping the tripot housing to allow sufficient press force of the drive shaft into the transmission can arise. Similar challenges arise during disassembly of the tripot housing and drive shaft from the transmission. It has been discovered that the disassembly typically requires a significantly greater pull force to remove the drive shaft from the transmission compared to the push force required to assemble the drive shaft into the transmission. Accordingly, whatever feature is provided to facilitate assembly and disassembly must meet both the push and pull force requirements. A solution for providing a suitable push/pull feature is made difficult due to the need to maintain a sufficient wall thickness of the tripot housing to avoid possible distortion of the roller tracks with the tripot housing.

SUMMARY OF THE INVENTION

It is an object of the present disclosure to provide a constant velocity joint, referred to hereafter as a tripot joint, that overcomes at least the drawbacks discussed above with regard to the assembly and disassembly of known tripot joints.

It is a further object of the present disclosure to provide a tripot housing having an assembly and disassembly feature that avoids unwanted distortion to roller tracks within the housing.

It is a further object of the present disclosure to provide a tripot housing having an assembly and disassembly feature that is economical in manufacture and assembly.

According to an embodiment of the present disclosure, a tripot housing is provided. The tripot housing includes a housing body that extends between a first end and a second end along an axis, with the second end being open and the first end having an end wall. A drive shaft extends from the end wall along the axis away from the second end. The housing body has an outer surface and an inner surface. The inner surface defines a roller track, also referred to as guide channel, that extends between the first end and the second end. The outer surface has a first region extending axially along a direction from the first end toward the second end to a shoulder that extends radially outwardly from the first region. The outer surface has a second region extending axially from the shoulder toward the second end. A ring has an inner surface disposed in an interference fit on first region and an outer surface extending radially outwardly from the second region. The portion of the ring extending radially outwardly from the second region provides a gripping feature to function as a push/pull feature to facilitate both assembly and disassembly of the tripot housing from the drive source.

In accordance with another aspect of the disclosure, the ring is in engagement with the shoulder, thereby providing a positive stop via the shoulder to prevent movement of the ring relative to the tripot housing during disassembly of the tripot housing from the drive source, absent breaking the ring.

In accordance with another aspect of the disclosure, the first region can be formed having a tapered region that increases in diameter along an axial direction extending from the first end toward the shoulder.

In accordance with another aspect of the disclosure, the tapered region can be formed having a conical shape.

In accordance with another aspect of the disclosure, the first region can be formed having a cylindrical region between the tapered region and the shoulder.

In accordance with another aspect of the disclosure, the inner surface of the ring is provided to form an interference fit with the cylindrical region.

In accordance with another aspect of the disclosure, the inner surface of the ring can be provided to form a clearance fit with at least a portion of the tapered region.

In accordance with another aspect of the disclosure, the inner surface of the ring can be provided to form an interference fit with at least a portion of the tapered region.

In accordance with another aspect of the disclosure, the interference fit can be formed to provide an axial press off force of the ring from the first region along a direction extending from the shoulder toward the first end of at least 1000 N.

In accordance with another aspect of the disclosure, the shoulder prevents the ring from moving onto the second region absent breaking the ring, thereby providing an ability to reliably disassemble the tripot housing from a drive source, such as a transmission.

In accordance with another aspect of the disclosure, a tripot housing is provided including a housing body extending between a first end and a second end along an axis. The second end is open and the first end has an end wall. The housing body has an outer surface and an inner surface. The inner surface has a guide channel that extends between the first end and the second end. The outer surface has a first region extending axially along a direction from the first end toward the second end to a shoulder that extends radially outwardly to a second region. The second region extends axially from the shoulder toward the second end. The first region has a tapered region that increases in circumference, along an axial direction extending from the first end toward the shoulder, to a cylindrical region. A drive shaft extends from the end wall along the axis away from the second end. A ring has an inner surface sized for an interference fit with at least a portion of the tapered region and with the cylindrical region, and an outer surface that extends radially outwardly from the second region. The portion of the ring extending radially outwardly from the second region provides a gripping feature to act as a push/pull feature to facilitate assembly and disassembly of the tripot housing from the drive source.

According to yet another embodiment of the present disclosure, a method of manufacturing a tripot housing is provided. The method includes providing a housing body extending between a first end and a second end along an axis, with the second end being open and the first end having an end wall with a drive shaft extending from the end wall along the axis away from the second end. Further, providing the housing body having an outer surface and an inner surface, with the inner surface having a guide channel that extends between the first end and the second end, and the outer surface having a first region extending axially along a direction from the first end toward the second end to a shoulder that extends radially outwardly to a second region, with the second region extending axially from the shoulder toward the second end. Further yet, providing a ring having an inner surface and an outer surface, and pressing the inner surface into an interference fit with the first region with the outer surface extending radially outwardly from the second region.

In accordance with another aspect of the disclosure, the method can further include providing the first region having a tapered region that increases in circumference, along an axial direction extending from the first end toward the shoulder, to a cylindrical region, and pressing the inner surface into an interference fit with at least a portion of the tapered region.

In accordance with another aspect of the disclosure, the method can further include providing the first region having a cylindrical region extending from the tapered region to the shoulder and pressing the inner surface into an interference fit with the cylindrical region.

In accordance with another aspect of the disclosure, the method can further include pressing the ring into engagement with the shoulder.

In accordance with another aspect of the disclosure, the method can further include bringing the inner surface of the ring into a clearance fit with at least a portion of the tapered region prior to pressing the inner surface into an interference fit with the tapered region.

In accordance with another aspect of the disclosure, the method can further include forming the interference fit between the cylindrical region and the inner surface to provide an axial press off force of the ring from the first region along a direction extending from the shoulder toward the first end of at least 1000 N.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Referring now to the Figures, where the invention will be described with reference to specific embodiments, without limiting same, it is to be understood that the disclosed embodiments are merely illustrative of the invention that is embodied in various and alternative forms. The figures are not necessarily to scale; some features are exaggerated or minimized to show details of particular components. Therefore, specific structural and functional details disclosed herein are not to be interpreted as limiting, but merely as a representative basis for teaching one skilled in the art to variously employ the present invention.

Figure 1:
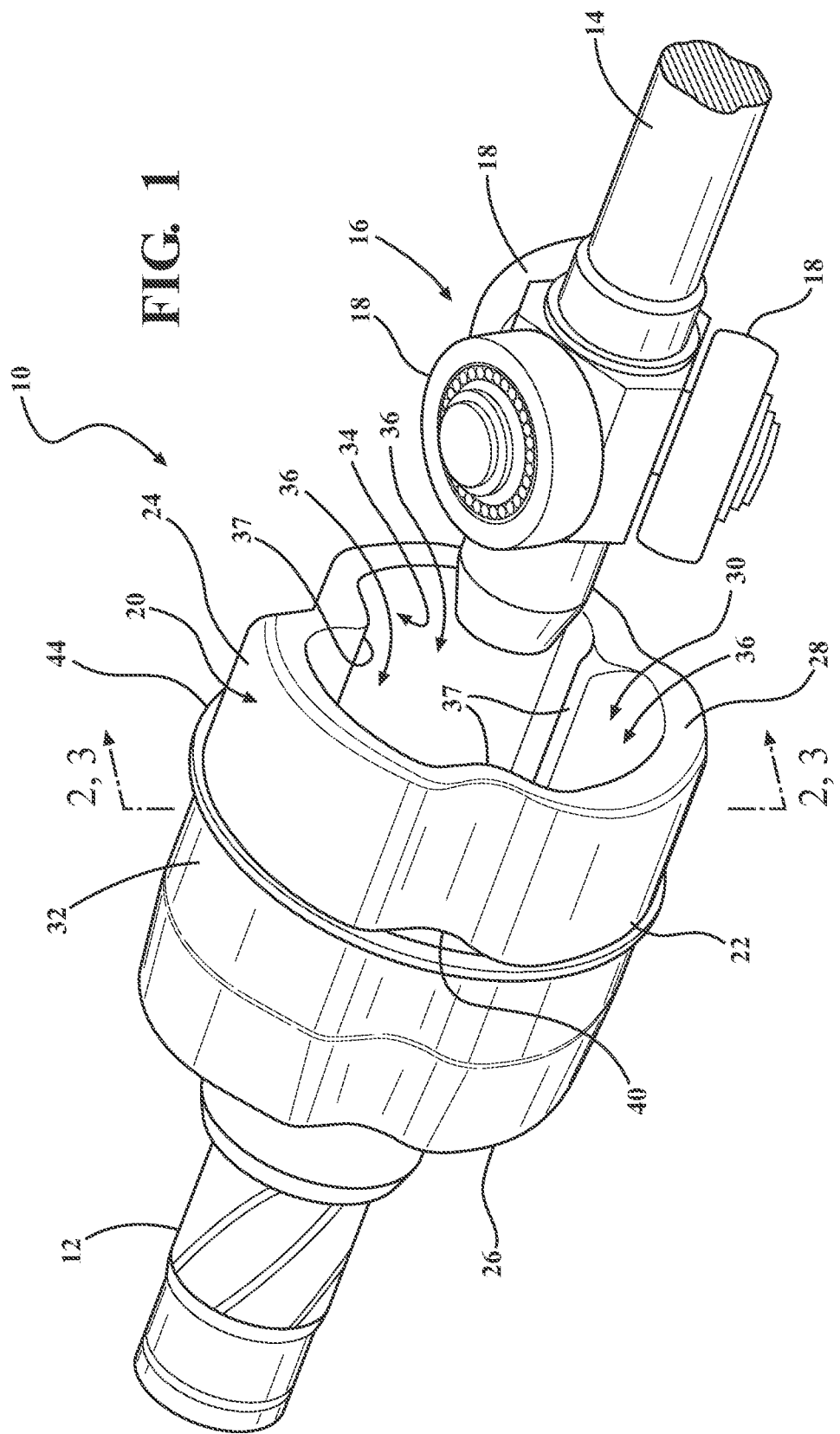
FIG. 1 is a perspective view of a tripot joint in accordance with an aspect of the disclosure.

Referring to FIG. 1, a tripot joint 10 enables torque transfer between two rotatable shaft members with possible axial position or angular position changes relative to each other. The tripot joint 10 is configured to transmit torque from a drive shaft, referred to hereafter as first shaft member 12, to a driven shaft, referred to hereafter as a second shaft member 14 through a spider member 16, shown as having a plurality rollers, also referred to as ball members 18, by way of example and without limitation. The spider member 16 is operatively connected to the first shaft member 12 for driven movement through various rotational speeds, joint angles, or telescopic positions via a tripot housing 20.

The tripot housing 20 has a housing body 22 with a wall 24 extending between a first end 26 and a second end 28 along a central axis CA. The wall 24 bounds an inner cavity 30, wherein the second end 28 is open to the inner cavity 30, whereas the first end 26 has an end wall 31 to close off the inner cavity 30. The drive shaft 12 is shown extending from the end wall 31 along the central axis CA in coaxial relation therewith away from the first and second ends 26, 28. Accordingly, the wall 24 is generally cup-shaped with the wall 24 being annular and extending between the closed first end 26 and the open second end 28. The wall 24 of the housing body 22 has an outer surface 32 and an inner surface 34. The inner surface 34 has a plurality of guide channels 36, shown as three, thereby being referred to as a tri-lobe guide channel, by way of example and without limitation, that extends between the first end 26 and the second end 28. Each guide channel 36 extends axially along and is disposed substantially parallel to the central axis CA. Each guide channel 36 extends radially toward the outer surface 32 of the housing body 22 between circumferentially spaced apart separators 37. Each guide channel 36 is configured to receive a roller 18 of the spider member 16 such that the spider member 16 is received for axially telescoping, pivotal movement within the inner cavity 30 of the tripot housing 20.

Figure 2:
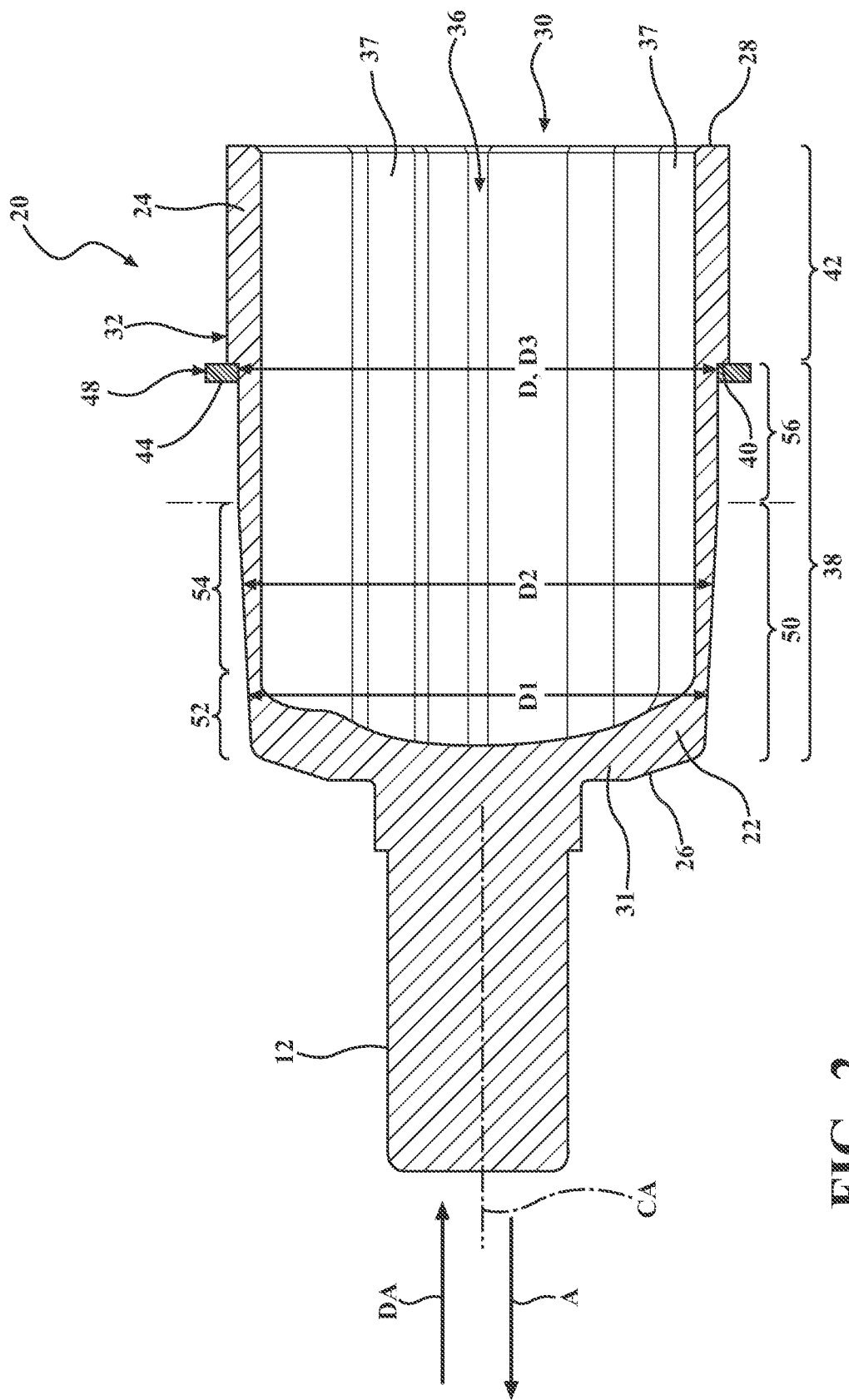
FIG. 2 is a cross-sectional view of a tripot housing taken generally parallel to a longitudinal axis of the tripot housing of the tripot joint of FIG. 1.

As best identified in FIG. 2, the outer surface 32 has a first region 38 extending axially along an axial direction, in parallel relation to the central axis CA, from the first end 26 toward the second end 28 to a shoulder 40 that extends radially outwardly from the outer surface 32 of the first region 38. The outer surface 32 has a second region 42 extending axially along an axial direction, in parallel relation to the central axis CA, from the shoulder 40 toward the second end 28.

The tripot housing 20 further includes an annular member, referred to hereafter as ring 44, shown as being a circumferentially continuous of material, to provide optimized hoop strength, having an inner surface 46 with an inner diameter D disposed in an interference fit on the first region 38 and an outer surface 48 extending radially outwardly, relative to the central axis CA, from the second region 42. The outer surface 48 can be sized to extend radially outwardly a predetermined distance from the second region 42, as desired, such that a majority of the ring can be exposed to provide a gripping/pushing/pulling surface outwardly from the second region 42. The interference fit between the ring 44 and the first region 38 facilitates assembly of the tripot housing 20 to a drive source, such that a press force can be applied to the ring 44 during assembly to insert the first shaft 12 along a direction indicated by arrow A (FIG. 2) into mating, coupled relation with the drive source, such as a gear member of a transmission, differential or power-take-off unit, by way of example and without limitation. The interference fit can be established, as desired, to allow the ring 44 to withstand a range of assembly press forces, as anticipated in a given application. For example, if the press force of assembly of the first shaft 12 to the drive source is anticipated to be about 500 N along arrow A, the interference fit can be established by forming a press fit between the ring 44 and the first region 38 between about 750-1250 N, thereby providing assurance that the ring 44 will withstand the assembly press force without moving away from the shoulder 40. Accordingly, the ring 44 can be pressed onto the first region 44 into engagement with the shoulder 40 via an axial force between about 750-1250 N, and in one embodiment, under a press force of 1000 N was used, thereby assuring that the assembly press force of 500 N will not cause the ring 44 to move relative to the tripot housing 20. As will be understood by a person possessing ordinary skill in the art, during service of the tripot joint 10, or for any other reason requiring the tripot joint 10 to be removed from the drive source, a removal or disassembly force of any magnitude can be applied along a direction indicated by arrow DA (FIG. 2) to the portion of the ring 44 extending radially outwardly from the second region 42 without concern of the ring 44 becoming dislodged or moving axially relative to the tripot housing 20 as a result of the shoulder 40 interfering with axial movement of the ring 44 toward the second end 28, barring breaking the ring 44.

As best shown in FIG. 2, the first region 38 of the outer surface 32 can be formed having a tapered region 50 that increases in circumference, such as in diameter or major diameter, continuously along an axial direction extending from the first end 26 toward the shoulder 40. In one exemplary, non-limiting embodiment, the tapered region 50 can be formed having a conical contour, shown as being frustoconical. The diameter D of the inner surface 46 of the ring 44 can be formed to have a clearance fit with at least a portion 52 of the tapered region 50, with one skilled in the art recognizing that the clearance would be provided over an initial lead-in region 52 having a diameter D1 that is less than the diameter D of the ring inner surface 46. Then, after the initial lead-in region 52, the inner surface 46 of the ring 44 has an interference fit with a steadily increasing diameter D2 of a remaining portion 54 of the constant tapered region 50, with the interference steadily increasing as the ring 44 is moved axially along the remaining portion 54 toward the shoulder 40. In the embodiment shown in FIG. 2, the first region 38 has a cylindrical region 56 with a fixed diameter D3 extending between the tapered region 50 and the shoulder 40. The cylindrical region 56 is shown as extending from the tapered region 50 to the shoulder 40. The diameter D3 of the cylindrical region 56 is sized to provide the maximum desired interference fit with the inner surface 46 of the ring 44, and thus, to withstand the maximum press force anticipated during assembly of the tripot housing 20 to the drive source. The axial length of the tapered region 50 and the axial length of the cylindrical region 54 can be provided as desired to provide the interference fit in optimal manner. It is to be understood that the shorter the cylindrical region 56, the easier assembly of the ring 44 against the shoulder 40 is made, as this requires a lesser extent of axial travel of the ring 44 over the largest diameter region, namely, the cylindrical region 56.

Figure 3:
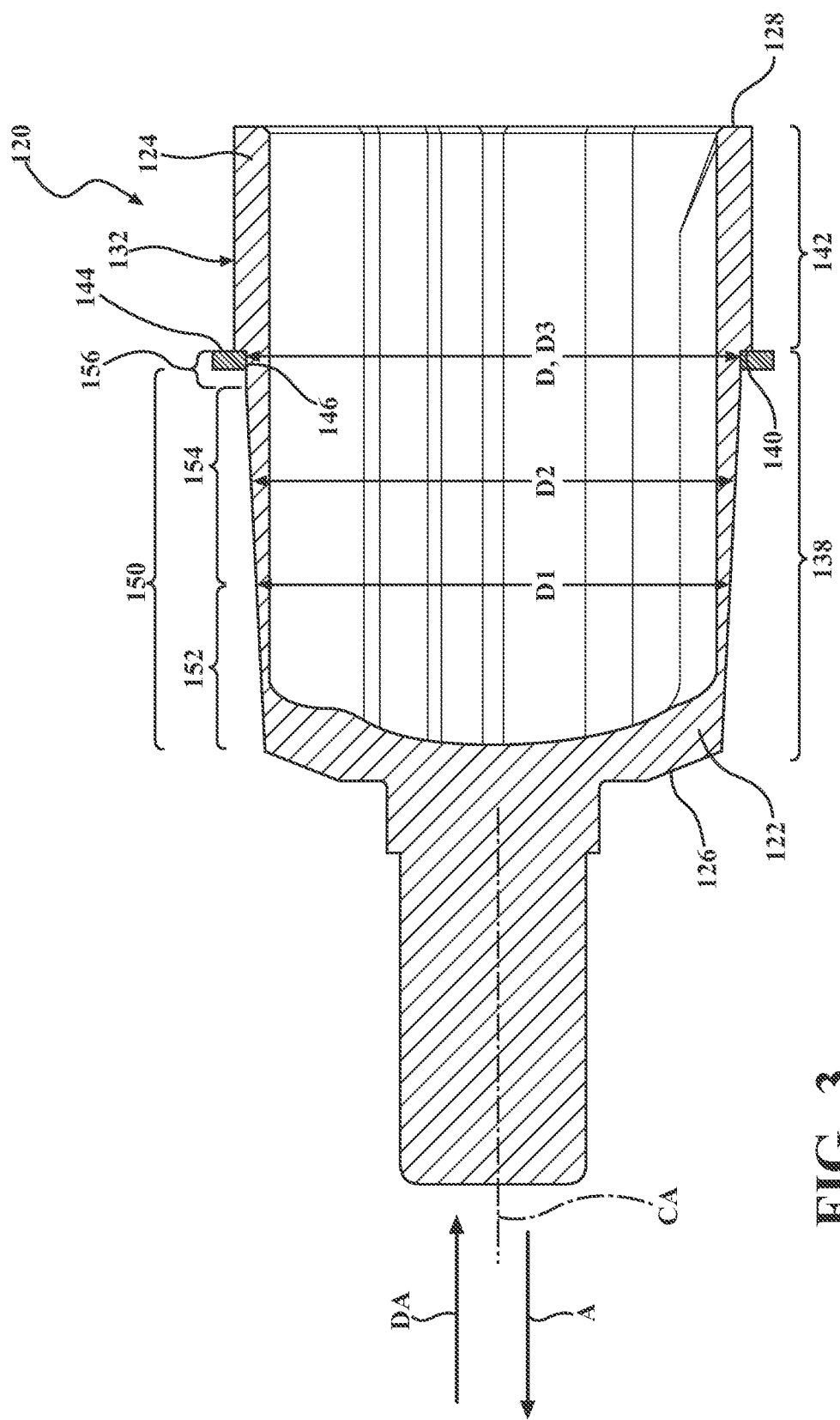
FIG. 3 is a view similar to FIG. 2 of a tripot housing in accordance with another aspect of the disclosure.

In FIG. 3, a tripot housing 120 constructed in accordance with another aspect of the disclosure is shown, wherein the same reference numerals as used above, offset by a factor of 100, are used to identify like features.

Tripot housing 120 is similar to the tripot housing 20, and thus, only the notable difference is discussed hereafter, with all else being the same as discussed above. The tripot housing 120 has a housing body 122 with an annular wall 124 forming an outer surface 132. The outer surface 132 has a first region 138 extending axially along an axial direction, in parallel relation to a central axis CA, from a first end 126 toward a second end 128 to a shoulder 140 that extends radially outwardly from the outer surface 132 of the first region 138, as discussed above. The outer surface 132 has a second region 142 extending axially along an axial direction, in parallel relation to central axis CA, from the shoulder 140 toward the second end 128, and shown as extending to the end 128.

The first region 138 of the outer surface 132 can be formed having a tapered region 150 that increases in circumference, such as in diameter or major diameter, continuously along an axial direction extending from the first end 126 toward the shoulder 140. A diameter D of the inner surface 146 of the ring 144 can be formed to have a clearance fit with at least a portion 152 of the tapered region 150, with one skilled in the art recognizing that the clearance would be provided over an initial lead-in region 152 having a diameter D1 that is less than the diameter D of the ring inner surface 146. Then, after the initial lead-in region 152, the inner surface 146 of the ring 144 has an interference fit with a steadily increasing diameter D2 of a remaining portion 154 of the constant tapered region 150, with the interference steadily increasing as the ring 144 is moved axially along the remaining portion 154 toward the shoulder 140. In the embodiment shown in FIG. 3, the first region 138 has a cylindrical region 156 with a fixed diameter D3 extending between the tapered region 150 and the shoulder 140. The cylindrical region 156 is shown as extending beneath the inner surface 146 of the ring 144, with the cylindrical region 156 terminating immediately adjacent the ring 144. Accordingly, the tapered region 150 forms the vast majority of the first region 138, with the cylindrical region forming only the region radially aligned with the ring 144, and possibly a region extending about a width of the ring 144 away from the ring 144 after assembly. The diameter D3 of the cylindrical region 156 is sized to provide the maximum desired interference fit with the inner surface 146 of the ring 144, with the relatively short axial length of the cylindrical region 154 providing the interference fit as desired to facilitate assembly of the tripot housing 120 to the drive source, while at the same time minimizing the axial length of the maximum interference fit along which the ring 144 needs to be pressed into engagement against the shoulder 140 during assembly of the ring 144 onto the housing body 122.

Figure 4:
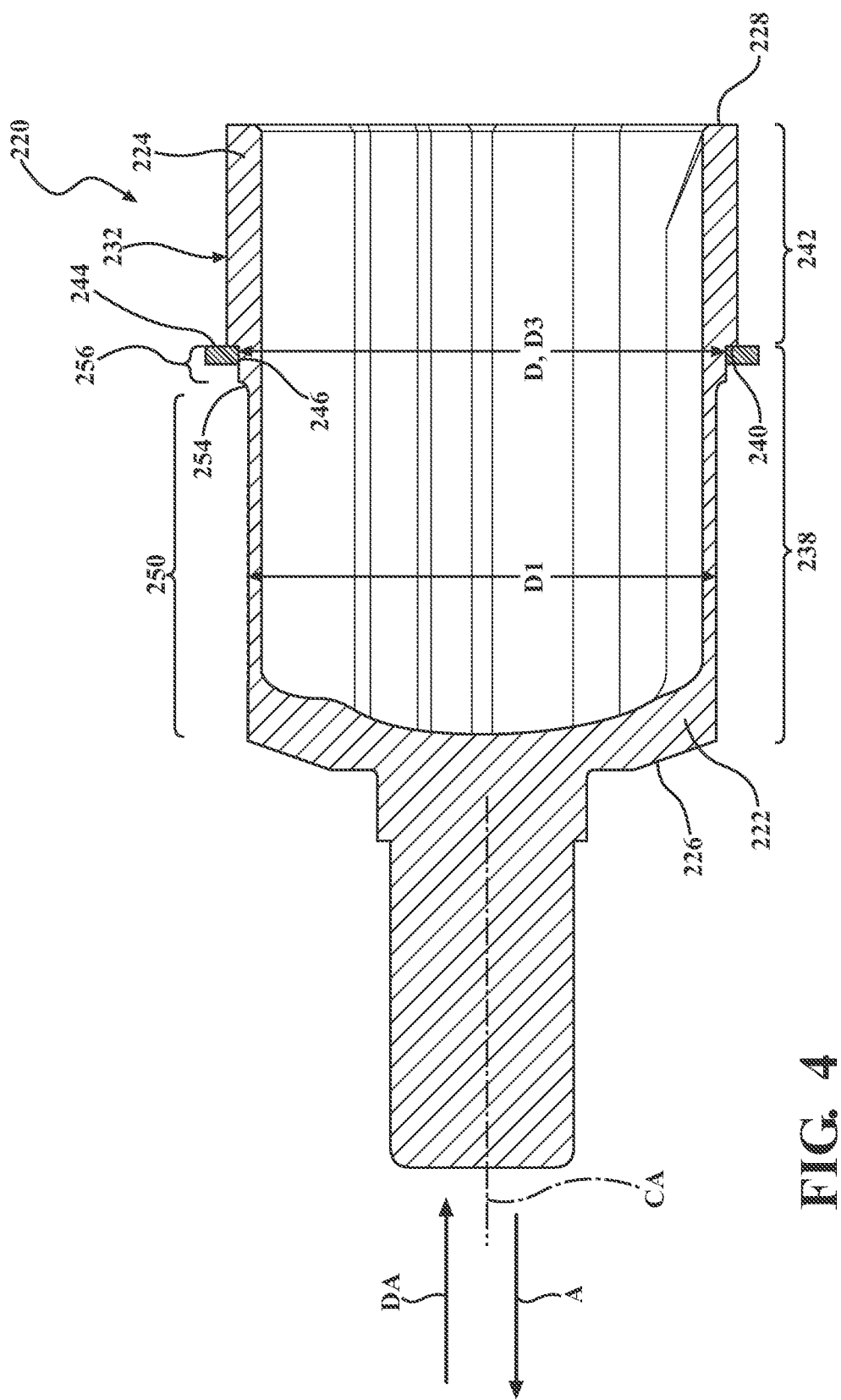
FIG. 4 is a view similar to FIGS. 2 and 3 of a tripot housing in accordance with yet another aspect of the disclosure.

In FIG. 4, a tripot housing 220 constructed in accordance with another aspect of the disclosure is shown, wherein the same reference numerals as used above, offset by a factor of 200, are used to identify like features.

Tripot housing 220 is similar to the tripot housings 20, 120, and thus, only the notable difference is discussed hereafter, with all else being the same as discussed above. The tripot housing 220 has a housing body 222 with an annular wall 224 forming an outer surface 232. The outer surface 232 has a first region 238 extending axially along an axial direction, in parallel relation to a central axis CA, from a first end 226 toward a second end 228 to a shoulder 240 that extends radially outwardly from a maximum outer diameter of the outer surface 232 of the first region 238, as discussed above. The outer surface 232 has a second region 242 extending axially along an axial direction, in parallel relation to central axis CA, directly from the shoulder 240 toward the second end 228, and shown as extending directly to the end 228, as shown and discussed above for the previous embodiments.

The first region 238 of the outer surface 232 can be formed having a first cylindrical region 250 having a constant diameter D1 extending from the first end 226 toward the shoulder 240 and a second cylindrical region 256 having a constant diameter D3 extending to the shoulder 240, with a tapered surface 254 extending directly from the first cylindrical region 250 directly to the second cylindrical region 254. The diameter D1 is formed to have a clearance fit with a ring inner surface 246 diameter D of a ring 244, while the diameter D3 of the second cylindrical region 256 is formed to provide an interference fit with the ring inner surface 246 diameter D. The tapered region 254 can be provided as a straight taper or, as shown, having a radius, shown, by way of example and without limitation, as a constant concave radius of any desired dimension, including less than or greater than a thickness of the ring 244. If less than the thickness of the ring 244, the transition between the different diameter regions D1, D3 occurs quickly over a minimal axial distance. Further, the second cylindrical region 256 can be made relatively short as compared to the first cylindrical region 250, such as about 1 to 4 times the thickness of the ring 244, by way of example and without limitation, thereby making the axial distance over which the interference fit between the inner surface 246 and the second cylindrical region 254 relatively short, thus, simplifying assembly. In the embodiment shown in FIG. 4, the first cylindrical region 250 forms the vast majority of the first region 238, with the second cylindrical region 256 forming only the region radially aligned with the ring 244 and slightly more, including a region extending about 1-4 times the width of the ring 244 away from the ring 244 after assembly. Accordingly, assembly is greatly simplified with the axial distance over which the ring 244 has an interference fit with the outer surface 232 being minimal.

Figure 5:
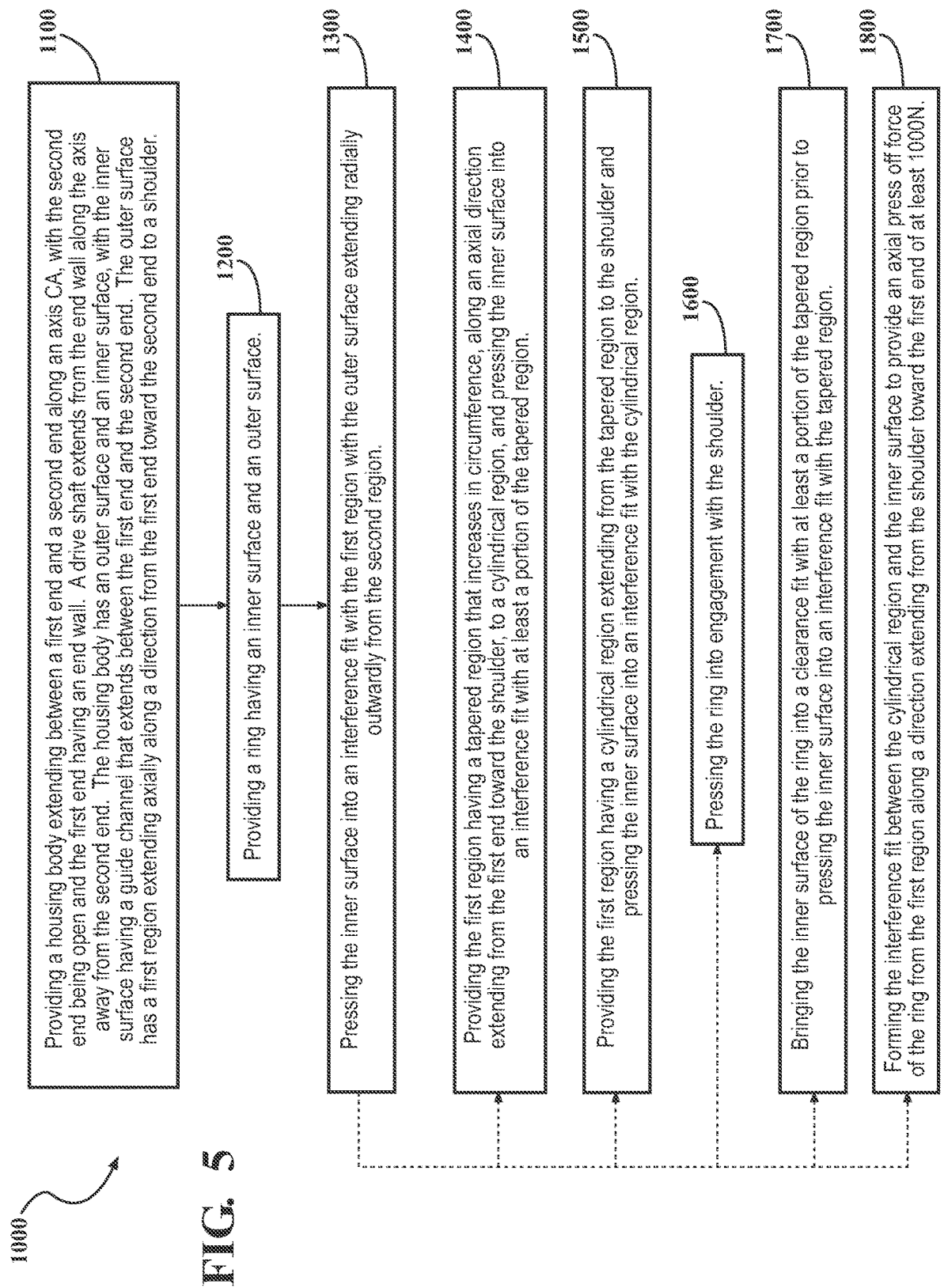
FIG. 5 is a flow diagram illustrating a method of manufacturing a tripot housing in accordance with another aspect of the disclosure.

In accordance with another aspect of the disclosure, as diagrammatically illustrated in FIG. 5, a method 1000 of manufacturing a tripot housing 20, 120, 220 is provided. The method 1000 incudes a step 1100 of providing a housing body 22, 122, 222 extending between a first end 26, 126, 226 and a second end 28, 128, 228 along an axis CA, with the second end 28, 128, 228 being open and the first end 26, 126, 226 having an end wall 31. A drive shaft 12 extends from the end wall 31 along the axis CA away from the second end 28, 128, 228. The housing body 22, 122, 222 has an outer surface 32, 132, 232 and an inner surface 34, with the inner surface 34 having a guide channel 36 that extends between the first end 26, 126, 226 and the second end 28, 128 228. The outer surface 32, 132, 232 has a first region 38, 138, 238 extending axially along a direction from the first end 26, 126, 226 toward the second end 28, 128, 228 to a shoulder 40, 140, 240. The shoulder 40, 140, 240 extends radially outwardly to a second region 42, 142, 242. The second region 42, 142, 242 extends axially from the shoulder 40, 140, 240 toward the second end 28, 128, 228. The method 1000 further includes a step 1200 of providing a ring 44, 144, 244 having an inner surface 46, 146, 246 and an outer surface 48; and, a step 1300 of pressing the inner surface 46, 146, 246 into an interference fit with the first region 38, 138 with the outer surface 48 extending radially outwardly from the second region 42, 142, 242.

The method 1000 can further include a step 1400 of providing the first region 38, 138 having a tapered region 50, 150 that increases in circumference, along an axial direction extending from the first end 26, 126 toward the shoulder 40, 140, to a cylindrical region 56, 156, and pressing the inner surface 46, 146 into an interference fit with at least a portion of the tapered region 50, 150.

The method 1000 can further include a step 1500 of providing the first region 38, 138 having a cylindrical region 56, 156 extending from the tapered region 50, 150 to the shoulder 40, 140 and pressing the inner surface 46, 146 into an interference fit with the cylindrical region 56, 156.

The method 1000 can further include a step 1600 of pressing the ring 44, 144 into engagement with the shoulder 40, 140.

The method 1000 can further include a step 1700 of bringing the inner surface 46, 146 of the ring 44, 144 into a clearance fit with at least a portion 52, 152 of the tapered region 50, 150 prior to pressing the inner surface 46, 146 into an interference fit with the tapered region.

The method 1000 can further include a step 1800 of forming the interference fit between the cylindrical region 56, 156, 256 and the inner surface 46, 146, 246 to provide an axial press off force of the ring 44, 144, 244 from the first region 38, 138, 238 along a direction extending from the shoulder 40, 140, 240 toward the first end 26, 126, 226 of at least 1000 N.

Throughout this specification, the term "attach," "attachment," "connected", "coupled," "coupling," "mount," or "mounting" shall be interpreted to mean that a structural component or element is in some manner connected to or contacts another element, either directly or indirectly through at least one intervening structural element, or is integrally formed with the other structural element.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:
1. A tripot housing, comprising:
a housing body extending between a first end and a second end along an axis, the second end being open and the first end having an end wall, the housing body having an outer surface and an inner surface, the inner surface having a guide channel that extends between the first end and the second end, the outer surface having a first region extending axially along a direction from the first end toward the second end to a shoulder that extends radially outwardly from the first region and a second region extending axially from the shoulder toward the second end;
a drive shaft extending from the end wall along the axis away from the second end; and a ring having an inner surface disposed in an interference fit on the first region and an outer surface extending radially outwardly from the second region.

2. The tripot housing of claim 1, wherein the ring is in engagement with the shoulder.

3. The tripot housing of claim 1, wherein the first region has a tapered region that increases in diameter along an axial direction extending from the first end toward the shoulder.

4. The tripot housing of claim 3, wherein the tapered region is conical.

5. The tripot housing of claim 3, wherein the first region has a cylindrical region between the tapered region and the shoulder.

6. The tripot housing of claim 5, wherein the inner surface of the ring has an interference fit with the cylindrical region.

7. The tripot housing of claim 6, wherein the inner surface of the ring has a clearance fit with at least a portion of the tapered region.

8. The tripot housing of claim 7, wherein the inner surface of the ring has an interference fit with at least a portion of the tapered region.

9. The tripot housing of claim 1, wherein the interference fit provides an axial press off force of the ring from the first region along a direction extending from the shoulder toward the first end of at least 1000 N.

10. The tripot housing of claim 9, wherein the shoulder prevents the ring from moving onto the second region absent breaking the ring.

11. A method of manufacturing a tripot housing, comprising:
providing a housing body extending between a first end and a second end along an axis, the second end being open and the first end having an end wall with a drive shaft extending from the end wall along the axis away from the second end, the housing body having an outer surface and an inner surface, the inner surface having a guide channel that extends between the first end and the second end, the outer surface having a first region extending axially along a direction from the first end toward the second end to a shoulder that extends radially outwardly to a second region, the second region extending axially from the shoulder toward the second end;
providing a ring having an inner surface and an outer surface; and
pressing the inner surface into an interference fit with the first region with the outer surface extending radially outwardly from the second region.

12. The method of claim 11, further including providing the first region having a tapered region that increases in circumference, along an axial direction extending from the first end toward the shoulder, to a cylindrical region, and pressing the inner surface into an interference fit with at least a portion of the tapered region.

13. The method of claim 12, further including providing the first region having a cylindrical region extending from the tapered region to the shoulder and pressing the inner surface into an interference fit with the cylindrical region.

14. The method of claim 13, further including pressing the ring into engagement with the shoulder.

15. The method of claim 13, further including bringing the inner surface of the ring into a clearance fit with at least a portion of the tapered region prior to pressing the inner surface into an interference fit with the tapered region.

16. The method of claim 13, further including forming the interference fit between the cylindrical region and the inner surface to provide an axial press off force of the ring from the first region along a direction extending from the shoulder toward the first end of at least 1000 N.

* * * * *